(12) United States Patent
Seago et al.

(10) Patent No.: US 8,862,972 B2
(45) Date of Patent: Oct. 14, 2014

(54) LOW LATENCY MULTI-DETECTOR NOISE CANCELLATION

(75) Inventors: Bradley D. Seago, Longmont, CO (US); Scott M. Dziak, Longmont, CO (US); Jingfeng Liu, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 232 days.

(21) Appl. No.: 13/171,615

(22) Filed: Jun. 29, 2011

(65) Prior Publication Data
US 2013/0007570 A1    Jan. 3, 2013

(51) Int. Cl.
*H03M 13/00*   (2006.01)
*G11B 20/10*   (2006.01)

(52) U.S. Cl.
CPC .... *G11B 20/10055* (2013.01); *G11B 20/10296* (2013.01); *G11B 2220/2516* (2013.01)
USPC ............................................ 714/795; 341/94

(58) Field of Classification Search
CPC . H03M 13/05; H03M 13/29; H03M 2201/64; G01R 33/0029; G06F 19/20
USPC .......... 714/795; 341/24, 94, 118; 360/46, 51, 360/53, 134; 329/318–320, 353; 332/107, 332/123, 159, 162
See application file for complete search history.

(56) References Cited

U.S. PATENT DOCUMENTS

| | | | |
|---|---|---|---|
| 5,278,703 A | 1/1994 | Rub et al. | |
| 5,278,846 A | 1/1994 | Okayama | |
| 5,317,472 A | 5/1994 | Schweitzer, III | |
| 5,325,402 A | 6/1994 | Ushirokawa | |
| 5,392,299 A | 2/1995 | Rhines | |
| 5,417,500 A | 5/1995 | Martinie | |
| 5,513,192 A | 4/1996 | Janku | |
| 5,523,903 A | 6/1996 | Hetzler | |
| 5,550,810 A | 8/1996 | Monogioudis et al. | |
| 5,550,870 A | 8/1996 | Blaker | |
| 5,612,964 A | 3/1997 | Haraszti | |
| 5,710,784 A | 1/1998 | Kindred | |
| 5,717,706 A | 2/1998 | Ikeda | |
| 5,802,118 A | 9/1998 | Bliss | |
| 5,844,945 A | 12/1998 | Nam | |
| 5,898,710 A | 4/1999 | Amrany | |

(Continued)

OTHER PUBLICATIONS

Nahlus, I.; Shaer, L.; Chehab, A.; Kayssi, A.; Mansour, M., "Low-power adder design techniques for noise-tolerant applications," Signal Processing Systems (SiPS), 2011 IEEE Workshop on , vol., No., pp. 117,121, Oct. 4-7, 2011.*

(Continued)

*Primary Examiner* — Cynthia Britt
(74) *Attorney, Agent, or Firm* — Hamilton DeSanctis & Cha

(57) ABSTRACT

Various embodiments of the present invention provide systems and methods for data processing. For example, a data processing circuit is disclosed that includes first and second data detectors and an error cancellation circuit. The first data detector is operable to perform a data detection process on a first signal derived from a data input to yield a detected output. The second data detector circuit is operable to perform a data detection process on a second signal derived from the data input to yield a second detected output. The error cancellation circuit is operable to combine a first error signal derived from the detected output with a second error signal derived from the second detected output to yield a feedback signal. The feedback signal is operable to modify the data input during a subsequent period.

23 Claims, 7 Drawing Sheets

(56) References Cited

U.S. PATENT DOCUMENTS

| | | | |
|---|---|---|---|
| 5,923,713 A | 7/1999 | Hatakeyama | |
| 5,978,414 A | 11/1999 | Nara | |
| 5,983,383 A | 11/1999 | Wolf | |
| 6,005,897 A | 12/1999 | Mccallister | |
| 6,023,783 A | 2/2000 | Divsalar | |
| 6,029,264 A | 2/2000 | Kobayashi | |
| 6,065,149 A | 5/2000 | Yamanaka | |
| 6,097,764 A | 8/2000 | McCallister | |
| 6,145,110 A | 11/2000 | Khayrallah | |
| 6,216,249 B1 | 4/2001 | Bliss | |
| 6,216,251 B1 | 4/2001 | McGinn | |
| 6,266,795 B1 | 7/2001 | Wei | |
| 6,317,472 B1 | 11/2001 | Choi | |
| 6,351,832 B1 | 2/2002 | Wei | |
| 6,377,610 B1 | 4/2002 | Hagenauer | |
| 6,381,726 B1 | 4/2002 | Weng | |
| 6,473,878 B1 | 10/2002 | Wei | |
| 6,535,553 B1 | 3/2003 | Limberg et al. | |
| 6,625,775 B1 | 9/2003 | Kim | |
| 6,748,034 B2 | 6/2004 | Hattori | |
| 6,757,862 B1 | 6/2004 | Marianetti, II | |
| 6,785,863 B2 | 8/2004 | Blankenship | |
| 6,810,502 B2 | 10/2004 | Eidson | |
| 6,856,790 B1* | 2/2005 | He | 455/63.4 |
| 6,970,511 B1 | 11/2005 | Barnette | |
| 6,986,098 B2 | 1/2006 | Poeppelman | |
| 7,047,474 B2 | 5/2006 | Rhee | |
| 7,058,873 B2 | 6/2006 | Song | |
| 7,073,118 B2 | 7/2006 | Greenberg | |
| 7,093,179 B2 | 8/2006 | Shea | |
| 7,117,427 B2 | 10/2006 | Ophir | |
| 7,133,228 B2 | 11/2006 | Fung | |
| 7,184,486 B1 | 2/2007 | Wu | |
| 7,191,378 B2 | 3/2007 | Eroz | |
| 7,203,887 B2 | 4/2007 | Eroz | |
| 7,308,057 B1* | 12/2007 | Patapoutian | 375/350 |
| 7,308,061 B1 | 12/2007 | Huang | |
| 7,310,768 B2 | 12/2007 | Eidson | |
| 7,313,750 B1 | 12/2007 | Feng | |
| 7,370,258 B2 | 5/2008 | Iancu | |
| 7,415,651 B2 | 8/2008 | Argon | |
| 7,502,187 B2* | 3/2009 | Annampedu et al. | 360/53 |
| 7,502,189 B2 | 3/2009 | Sawaguchi | |
| 7,523,375 B2 | 4/2009 | Spencer | |
| 7,587,657 B2 | 9/2009 | Haratsch | |
| 7,590,168 B2 | 9/2009 | Raghavan | |
| 7,646,829 B2 | 1/2010 | Ashley | |
| 7,702,986 B2 | 4/2010 | Bjerke | |
| 7,752,523 B1 | 7/2010 | Chaichanavong | |
| 7,779,325 B2 | 8/2010 | Song | |
| 7,802,172 B2 | 9/2010 | Vila Casado et al. | |
| 7,952,824 B2 | 5/2011 | Dziak | |
| 7,958,425 B2 | 6/2011 | Chugg | |
| 7,996,746 B2 | 8/2011 | Livshitz | |
| 8,018,360 B2 | 9/2011 | Nayak | |
| 8,154,972 B2* | 4/2012 | Ratnakar Aravind | 369/59.21 |
| 8,201,051 B2 | 6/2012 | Tan | |
| 8,237,597 B2 | 8/2012 | Liu | |
| 8,261,171 B2 | 9/2012 | Annampedu | |
| 8,291,284 B2 | 10/2012 | Savin | |
| 8,295,001 B2* | 10/2012 | Liu et al. | 360/46 |
| 2001/0043417 A1* | 11/2001 | Watanabe et al. | 360/51 |
| 2006/0023328 A1* | 2/2006 | Annampedu | 360/46 |
| 2008/0069373 A1 | 3/2008 | Jiang | |
| 2008/0304558 A1 | 12/2008 | Zhu et al. | |
| 2009/0027119 A1* | 1/2009 | Williams et al. | 330/149 |
| 2009/0132893 A1 | 5/2009 | Miyazaki | |
| 2009/0185643 A1 | 7/2009 | Fitzpatrick | |
| 2010/0208574 A1* | 8/2010 | Ratnakar Aravind et al. | 369/134 |
| 2011/0167227 A1 | 7/2011 | Yang | |
| 2011/0264987 A1 | 10/2011 | Li | |
| 2012/0124118 A1 | 5/2012 | Ivkovic | |
| 2012/0182643 A1 | 7/2012 | Zhang | |
| 2012/0212849 A1 | 8/2012 | Xu | |
| 2012/0262814 A1 | 10/2012 | Li | |
| 2012/0265488 A1 | 10/2012 | Sun | |

OTHER PUBLICATIONS

Ning Zhu; Wang-Ling Goh; Kiat-Seng Yeo, "An enhanced low-power high-speed Adder for Error-Tolerant application," Integrated Circuits, ISIC '09. Proceedings of the 2009 12th International Symposium on , vol., No., pp. 69,72, Dec. 14-16, 2009.*

Whatmough, P.; Das, S.; Bull, D.; Darwazeh, I., "Error-resilient low-power DSP via path-delay shaping," Design Automation Conference (DAC), 2011 48th ACM/EDAC/IEEE , vol., No., pp. 1008,1013, Jun. 5-9, 2011.*

Chang, Tien-Lin; White, S.A., "An error cancellation digital-filter structure and its distributed-arithmetic implementation," Circuits and Systems, IEEE Transactions on , vol. 28, No. 4, pp. 339,342, Apr. 1981.*

Axvig et al., "Average Min-Sum Decoding of LDPC Codes", 5th International Symposium on Turbo Codes and Related Topics (2008).

Bahl et al., "Optimal decoding of linear codes for minimizing symbol error rate", IEEE Trans. Inform. Theory, vol. 20, pp. 284-287 (Mar. 1974).

Blaum, "High-Rate Modulation Codes for Reverse Concatenation", IEEE Transactions on Magnetics, vol. 43, No. 2 (Feb. 2007).

Casado et al., Multiple-rate low-density parity-check codes with constant blocklength, IEEE Transations on communications, Jan. 2009, vol. 57, pp. 75-83.

Cui et al., "High-Throughput Layered LDPC Decoding Architecture", IEEE Transactions on Very Large Scale Integration (VLSI) Systems, vol. 17, No. 4 (Apr. 2009).

Fan et al., "Constrained coding techniques for soft iterative decoders" Proc. IEEE Global Telecommun. Conf., vol. 1b, pp. 631-637 (1999).

Fossorier, Marc P.C. "Quasi-Cyclic Low-Density Parity-Check Codes From Circulant Permutation Maricies" IEEE Transactions on Information Theory, vol. 50, No. 8 Aug. 8, 2004.

Gross, "Stochastic Decoding of LDPC Codes over GF(q)", HDPCC Workshop, Tel Aviv (Mar. 2, 2010).

Gunnam et al., "VLSI Architectures for Layered Decoding for Irregular LDPC Codes of WiMax", IEEE ICC Proceedings (2007).

Hagenauer, J. et al A Viterbi Algorithm with Soft-Decision Outputs and its Applications in Proc. IEEE Globecom, pp. 47. 11-47 Dallas, TX Nov. 1989.

Han and Ryan, "Pinning Techniques for Low-Floor Detection/Decoding of LDPC-Coded Partial Response Channels", 5th International Symposium on Turbo Codes &Related Topics, 2008.

Kautz, "Fibonacci Codes for Synchronization Control", IEEE Trans. Info. Theory, vol. 11, No. 2, pp. 284-292 (Apr. 1965).

Kschischang et al., "Factor Graphs and the Sum-Product Algorithm", IEEE Transactions on Information Theory, vol. 47, No. 2 (Feb. 2001).

Leduc-Primeau et al., "A Relaxed Half-Stochastic Iterative Decoder for LDPC Codes", IEEE Communications Society, IEEE Globecom proceedings (2009).

Lee et al., "Partial Zero-Forcing Adaptive MMSE Receiver for DS-CDMA Uplink in Multicell Environments" IEEE Transactions on Vehicular Tech. vol. 51, No. 5, Sep. 2002.

Li et al "Efficient Encoding of Quasi-Cyclic Low-Density Parity Check Codes" IEEE Transactions on Communications on 53 (11) 1973-1973, 2005.

Lim et al. "Convergence Analysis of Constrained Joint Adaptation in Recording Channels" IEEE Trans. on Signal Processing vol. 54, No. 1 Jan. 2006.

Lin et al "An efficient VLSI Architecture for non binary LDPC decoders"—IEEE Transaction on Circuits and Systems II vol. 57, Issue 1 (Jan. 2010) pp. 51-55.

Moon et al, "Pattern-dependent noise prediction in signal-dependent Noise," IEEE JSAC, vol. 19, No. 4 pp. 730-743, Apr. 2001.

Moon et al., "Maximum transition run codes for data storage systems", IEEE Trans. Magn., vol. 32, No. 5, pp. 3992-3994 (Sep. 1996).

Shokrollahi "LDPC Codes: An Introduction", Digital Fountain, Inc. (Apr. 2, 2003).

(56) References Cited

OTHER PUBLICATIONS

Spagnol et al, "Hardware Implementation of GF($2^\wedge$ m) LDPC Decoders", IEEE Transactions on Circuits and Systemsši: Regular Papers, vol. 56, No. 12 (Dec. 2009).

Tehrani et al., "Fully Parallel Stochastic LDPC Decoders", IEEE Transactions on Signal Processing, vol. 56, No. 11 (Nov. 2008).

Todd et al., "Enforcing maximum-transition-run code constraints and low-density parity check decoding", IEEE Trans. Magn., vol. 40, No. 6, pp. 3566-3571 (Nov. 2004).

U.S. Appl. No. 13/113,219, Unpublished (filed May 23, 2011) (Yang Han).

Vasic, B., "High-Rate Girth-Eight Codes on Rectangular Integer Lattices", IEEE Trans. Communications, vol. 52, Aug. 2004, pp. 1248-1252.

Vasic, B., "High-Rate Low-Density Parity-Check Codes Based on Anti-Pasch Affine Geometries," Proc ICC 2002, pp. 1332-1336.

Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.

Yeo et al., "VLSI Architecture for Iterative Decoders in Magnetic Recording Channels", Mar. 2001, pp. 748-755, IEEE trans. Magnetics, vol. 37, No. 2.

Zhang et al., "Analysis of Verification-Based Decoding on the q-ary Symmetric Channel for Large q", IEEE Trans. on Information Theory, vol. 57, No. 10 (Oct. 2011).

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VSLI Implementation", IEEE Transactions on Magnetics, v. 43, pp. 1118-1123, Mar. 7.

Zhong, "Block-LDPC: A Practical LDPC Coding System Design Approach", IEEE Trans. on Circuits, Regular Papers, vol. 5, No. 4, pp. 766-775, Apr. 2005.

\* cited by examiner

LOW LATENCY MULTI-DETECTOR NOISE CANCELLATION

BACKGROUND

Various embodiments of the present invention are related to systems and methods for data processing, and more particularly to systems and methods for low latency loop processing.

Various data processing circuits have been developed that include one or more loops. For example, a data signal may be processed by a data processing circuit in a loop in which information is fed back into itself. A loop that can track low frequency changes in the data signal requires a relatively large loop update gain, which is generally not available from a high latency loop. A low latency loop may be used to track low frequency changes in the data signal, although conventional low latency loops often introduce excessive errors leading to large loop noise.

Hence, for at least the aforementioned reasons, there exists a need in the art for advanced systems and methods for data processing.

BRIEF SUMMARY

Various embodiments of the present invention are related to systems and methods for data processing, and more particularly to systems and methods for low latency loop processing.

Various embodiments of the present invention provide systems and methods for data processing. For example, a data processing circuit is disclosed that includes first and second data detectors and an error cancellation circuit. The first data detector is operable to perform a data detection process on a first signal derived from a data input to yield a detected output. The second data detector circuit is operable to perform a data detection process on a second signal derived from the data input to yield a second detected output. The error cancellation circuit is operable to combine a first error signal derived from the detected output with a second error signal derived from the second detected output to yield a feedback signal. The feedback signal is operable to modify the data input during a subsequent period. In some cases, the first data detector circuit latency is greater than a second data detector circuit latency. In various cases, the first signal and the second signal are the same signal. In various cases, the circuit further includes an analog to digital converter circuit, a digital filter and a scaler. The analog to digital converter circuit is operable to convert the data input into a corresponding digital output. The digital filter is operable to filter the digital output and provide a filtered output. The scaler is operable to scale the digital output by a DC gain of the digital filter and provide a scaled output. In such cases, the first signal is the filtered output, and the second signal is the scaled output. In various instances of the aforementioned embodiments, the circuit includes a Nyquist detection circuit to detect an alternating bit pattern in the second detected output and to set the second detected output to zero when the alternating bit pattern is detected.

In some instances of the aforementioned embodiments, the error cancellation circuit includes a delay circuit and a summation circuit. The delay circuit is operable to delay the second error signal to yield a delayed second error signal. The summation circuit is operable to add the first error signal and add the second error signal and subtract the delayed second error signal to yield the feedback signal. In some cases, the delay circuit is operable to delay the second error signal to match a delayed second error signal latency with a first error signal latency.

In some instances of the aforementioned embodiments, the second data detector circuit includes a summation circuit, comparator circuit, delay circuit and multiplier circuit. The summation circuit is operable to sum the second signal with an interference value to yield a sum. The comparator circuit is operable to receive the sum and to provide the second detected output based at least in part on a value of the sum. The delay circuit is operable to delay the sum by a bit period to yield a delayed output. The multiplier circuit is operable to multiply the delayed output by an interference coefficient corresponding to a preceding bit period to yield the interference value. In some cases, the second data detector circuit also includes a second delay circuit and a second multiplier circuit. The second delay circuit is operable to delay the delayed output to yield a second delayed output. The second multiplier circuit is operable to multiply the second delayed output by a second interference coefficient corresponding to a second preceding bit period to yield a second interference value. The summation circuit is also operable to sum the second signal with the second interference value to yield the sum. The preceding bit period directly precedes a current bit period, and the second preceding bit period directly precedes the preceding bit period.

Other embodiments of the present invention provide methods for processing data. The methods include providing a first data detector circuit; providing a second data detector circuit; receiving a data input; performing a data detection process using the first data detector circuit on a first signal derived from the data input to yield a detected output; performing a second data detection process using the second data detector circuit on a second signal derived from the data input to yield a second detected output; calculating an error value based on a first error signal derived from the detected output and on a second error signal derived from the second detected output; generating a feedback signal based at least in part on the error value; and applying the feedback signal to modify the data input. In some cases, the latency between the data input and the first error signal is greater than the latency between the data input and the second error signal. In various cases, the error value is calculated by applying a delay to the second error signal to yield a delayed second error signal; subtracting the delayed second error signal from the first error signal to yield a corrected error signal; and adding the second error signal to the corrected error signal to yield the error value. In various cases, the second data detection process comprises reducing interference evident in a current bit that is related to at least one preceding bit in a bit stream using a decision feedback equalizer. In various cases, the methods also include replacing the feedback signal with digital samples of the data input when not in a tracking mode.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals may be used throughout several drawings to refer to similar components.

In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Various embodiments of the present invention are related to systems and methods for data processing, and more particularly to systems and methods for low latency loop processing.

Figure 1:
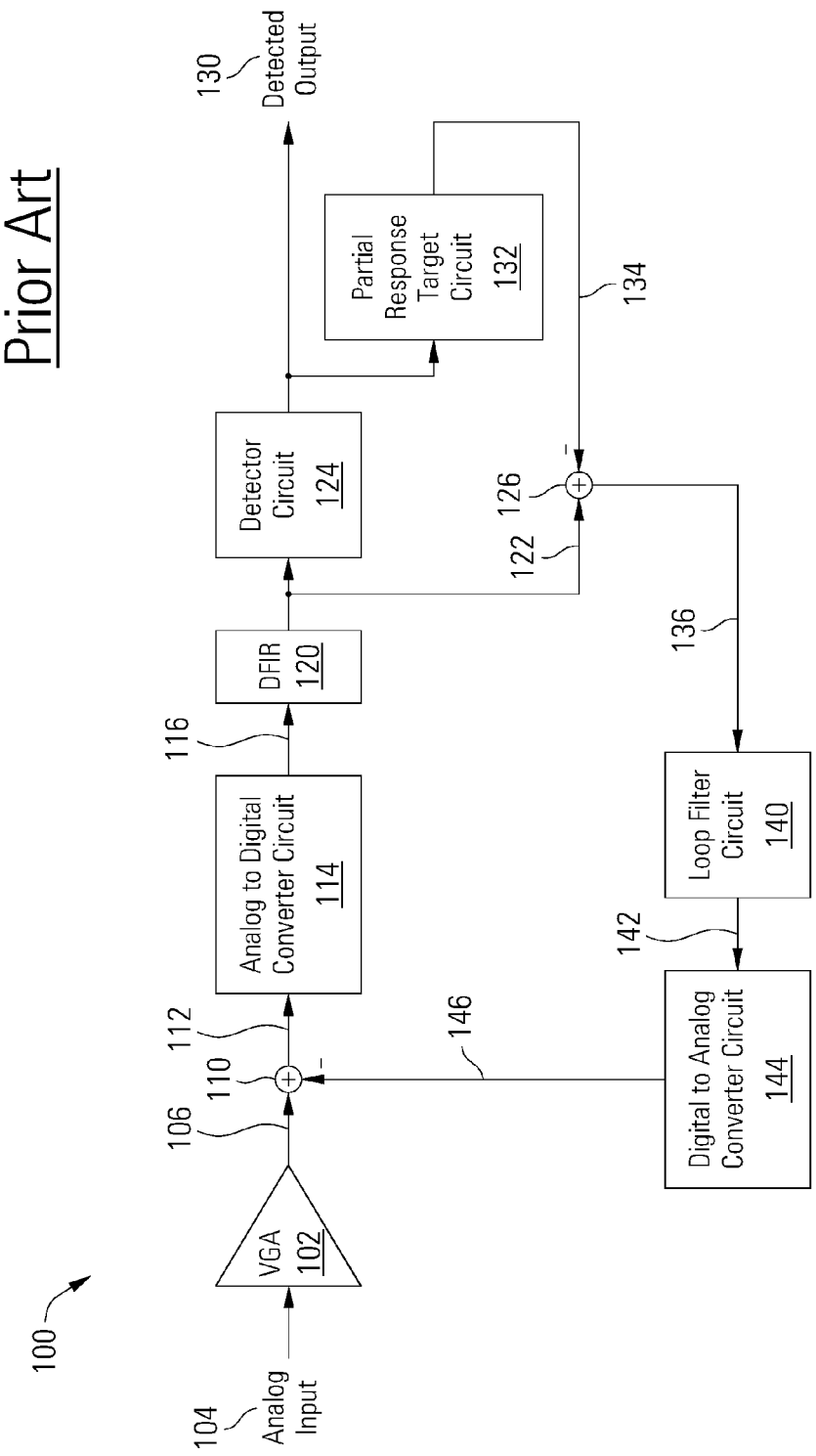
FIG. 1 depicts an existing loop circuit including low frequency noise correction feedback.

Turning to FIG. 1, an existing loop circuit 100 is shown that includes low frequency noise correction feedback. Loop circuit 100 includes a variable gain amplifier (VGA) 102 that receives an analog input 104. Variable gain amplifier 102 amplifies analog input 104 to yield an amplified output 106 that is provided to a summation circuit 110. Summation circuit 110 subtracts a feedback signal 146 from amplified output 106 to yield a sum 112.

Sum 112 is provided to an analog to digital converter circuit (ADC) 114 that converts the received signal into a series of digital samples 116 that are provided to a digital finite impulse response (DFIR) filter 120. Digital finite impulse response filter 120 acts as an equalizer and filters the received input to provide a corresponding filtered output 122 to both a detector circuit 124 and a summation circuit 126. Detector circuit 124 performs a data detection process on the received input resulting in a detected output 130. In performing the detection process, detector circuit 124 attempts to correct any errors in the received data input.

Detected output 130 is provided to a partial response (PR) target circuit 132 that creates a partial response output 134 compatible with filtered output 122. Summation circuit 126 subtracts partial response output 134 from filtered output 122 to yield an error value 136. Error value 136 is provided to a loop filter circuit 140 that filters the received input and provides a filtered output 142 to a digital to analog converter (DAC) circuit 144. Digital to analog converter circuit 144 converts the received input to feedback signal 146.

In operation, the delay from when amplified output 106 is initially provided until a corresponding value for feedback signal 146 is available may be too long. This latency can result in performance degradation or in the worst case scenario, inoperability.

Various embodiments of the present invention provide for mitigating low frequency noise, while maintaining acceptable levels of feedback latency to preserve overall loop gain. For example, the low frequency noise may be around (1/1000)T, where T is the bit period. Such low frequency noise can have an adverse impact on system performance. In some cases, the feedback signal is generated based upon a combined output from a low latency detector such as a decision feedback equalizer (DFE) and a more robust detector such as a Viterbi detector, with the DFE providing low latency error feedback and with the Viterbi detector then providing corrections to the feedback from the DFE. Thus, rapid error corrections may be made without sacrificing the superior error detection of a higher latency detector.

In general, a DC loop is used to mitigate low frequency noise, which can appear over brief time periods as a DC offset or bias in the input signal. If, for example, the output of the analog to digital converter circuit is designed to produce samples in the range of −31 to 31, with an average value of 0, low frequency noise can shift the average value up or down away from 0. This shifts the signal toward one of the rails of the analog to digital converter circuit, increasing the risk of saturation and signal clipping. The DC loop is used to integrate or average the digital samples, with the result used as an error signal which can be used to offset the analog input signal, centering the average value in the middle of the ADC range.

Figure 2:
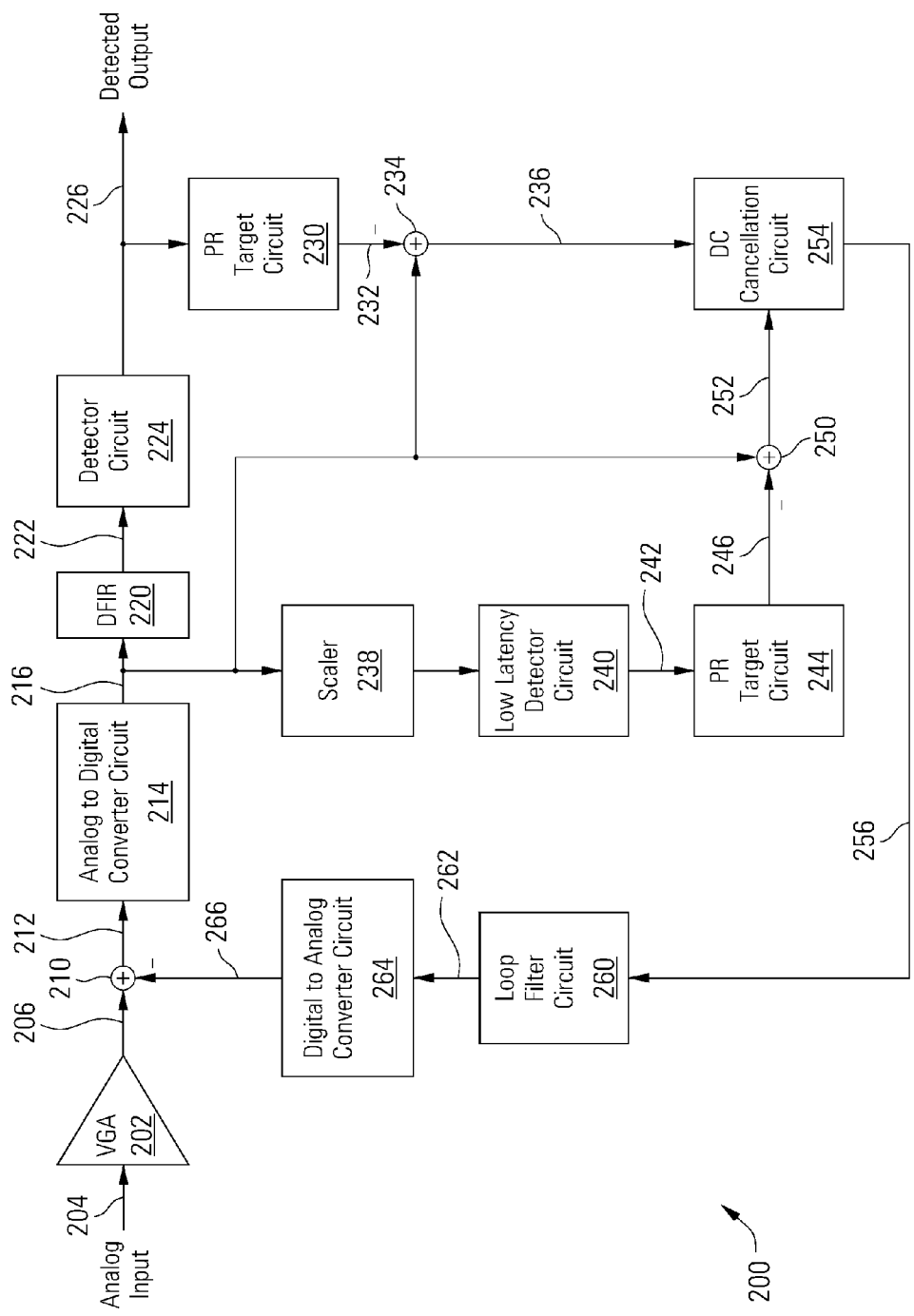
FIG. 2 depicts a low latency, multi-detector DC loop circuit in accordance with one or more embodiments of the present invention.

Turning to FIG. 2, a low latency multi-detector loop circuit 200 is shown in accordance with one or more embodiments of the present invention, as it may be used for near-DC noise cancellation. Low latency multi-detector loop circuit 200 includes a variable gain amplifier 202 that receives an analog input 204. Variable gain amplifier 202 may be any circuit known in the art that is capable of amplifying a received signal by a gain that can be changed. Based upon the disclosure provided herein, one of ordinary skill in the art will recognize a variety of circuits that may be used to implement variable gain amplifier 202. Analog input 202 may be any analog signal carrying information to be processed. In some embodiments of the present invention, analog input 202 is derived from a storage medium. In other embodiments of the present invention, analog input 202 is derived from a transmission device. Based upon the disclosure provided herein, one of ordinary skill in the art will recognize a variety of analog signals and/or sources thereof that may be used in relation to different embodiments of the present invention. Variable gain amplifier 202 amplifies analog input 204 to yield an amplified output 206 that is provided to a summation circuit 210. Summation circuit 200 subtracts a feedback signal 266 from amplified output 206 to yield a sum 212.

Sum 212 is provided to an analog to digital converter circuit 214. Analog to digital converter circuit 214 may be any circuit known in the art that is capable of converting an analog signal into a series of digital values representing the received analog signal. Analog to digital converter circuit 214 converts the received signal (sum 212) into a series of digital samples 216 that are provided to a digital finite impulse response filter 220. Digital finite impulse response filter 220 may be any circuit known in the art for filtering a digital signal. Digital finite impulse response filter 220 filters the received input (digital samples 216) and provides a corresponding filtered output 222 to a detector circuit 224. Detector circuit 224 may be any detector circuit known in the art including, but not limited to, a Viterbi algorithm detector circuit or a maximum a posteriori detector circuit. Based upon the disclosure provided herein, one of ordinary skill in the art will recognize a variety of detector circuits that may be used in relation to different embodiments of the present invention. Detector circuit 224 performs a data detection process on the received input resulting in a detected output 226. Detected output 226 may be provided to a downstream processor (not shown) that performs additional processing on the output.

In addition, detected output 226 is provided to a partial response target circuit 230 that creates a partial response output 232 compatible with digital samples 216. A summation circuit 234 subtracts partial response output 232 from digital samples 216 to yield an error value 236. Partial response target circuit 230 may be any convolution circuit known in the art, and based upon the disclosure provided herein, one of ordinary skill in the art will recognize a variety of partial response target circuits that may be used in relation to different embodiments of the present invention. Digital samples 216 are provided to digital finite impulse response filter 220 and detector circuit 224 that perform an equalization process and a data detection process on the received series of samples and provide a detected output 226. The partial response target circuit 230 operates to reconstruct digital samples 216 from detected output 226 using the same partial response target used by detector circuit 224. The partial response target circuit 230 provides a convolved partial response output 232, which, when subtracted from digital samples 216 using summation circuit 234, results in error value 236. It is expected that the data detection process will result in a reduction in the number of errors exhibited in detected output 226 in comparison with the number of errors exhibited in digital samples 216. Thus, where it is assumed that the number of errors in detected output 226 is approximately zero, error value 236 approximates the measured distance between the digital sample (i.e. y-actual) and that same sample in the absence of noise (i.e. y-ideal). However, the latency of generating the error value 236 can be undesirably long.

Digital samples 216 are also provided to a low latency detector circuit 240 through a scaler 238. Scaler 238 scales the digital samples 216 by the DC gain of the digital finite impulse response filter 220, thus eliminating the latency of the digital finite impulse response filter 220 in the path through the low latency detector circuit 240 and allowing a large DC loop bandwidth. Although this may reduce the accuracy of the results from the low latency detector circuit 240, in some embodiments the low latency of the path through the low latency detector circuit 240 is more important than the accuracy that would be gained by passing through the digital finite impulse response filter 220 before the low latency detector circuit 240. By scaling the digital samples 216 in scaler 238 before they are provided to the low latency detector circuit 240, the results of the low latency detector circuit 240 remain compatible with the results of the detector circuit 224. In other embodiments, the low latency detector circuit 240 may be provided with filtered output 222 from digital finite impulse response filter 220 rather than digital samples 216, omitting the scaler 238 and improving accuracy at the expense of latency and DC loop bandwidth.

Low latency detector circuit 240 may be any circuit known in the art that is capable of rapidly performing a data detection process on the received input resulting in a low latency detected output 242. In one particular embodiment of the present invention, low latency detector circuit 240 is a decision feedback equalizer (DFE). Low latency detector circuit 240 operates to provide a reasonable approximation of detected output 226 while not requiring the processing time of detector circuit 224. Low latency detector circuit 240 provides a low latency detected output 242 to a partial response target circuit 244. Partial response target circuit 244 creates a partial response output 246 compatible with digital samples 216. A summation circuit 250 subtracts partial response output 246 from digital samples 216 to yield a low latency error value 252, compatible with error value 236.

As described above with respect to detector circuit 224, digital samples 216 are provided to low latency detector circuit 240 that performs a data detection process on the received series of samples and provides low latency detected output 242. The partial response target circuit 244 operates to reconstruct digital samples 216 from low latency detected output 242 using the same partial response target used by low latency detector circuit 240. The partial response target circuit 244 provides a convolved partial response output 246, which, when subtracted from digital samples 216 using summation circuit 250, results in low latency error value 252. It is expected that the low latency data detection process will result in a reduction in the number of errors exhibited in low latency detected output 242 in comparison with the number of errors exhibited in digital samples 216. Thus, where it is assumed that the number of errors in low latency detected output 242 is approximately zero, low latency error value 252 approximates the number of errors in digital samples 216. Because the low latency detector circuit 240 performs data detection rapidly, it can be used to correct errors in the data stream from analog input 204 to detected output 226 without the longer delay of the more robust detector circuit 224. However, because of the low latency, the assumption that the number of errors in low latency detected output 242 is approximately zero may not always be correct.

The error value 236 and low latency error value 252 are provided to a DC cancellation circuit 254. DC cancellation circuit 254 operates to produce an error value 256 based on the error value 236 (which was produced based on the detector circuit 224) and on the low latency error value 252 (which was produced based on the low latency detector circuit 240). Of note, low latency detector circuit 240 may not provide the accuracy of detector circuit 224, but it reacts much more quickly to errors and the effect of any mistakes is limited by the DC cancellation circuit 254, as will be described in more detail below.

Error value 256 is provided to a loop filter circuit 260 that filters the received input and provides a filtered output 262 to a digital to analog converter circuit 264. Digital to analog converter circuit 264 converts the received input to feedback signal 266. In operation, the feedback signal 266 is used to cancel low frequency or near-DC noise in the amplified output 206, before digital sampling in the analog to digital converter circuit 214. Error correction based on the feedback signal 266 may also be performed in some embodiments after the digital samples 216, omitting the digital to analog converter circuit 264 and operating in the digital domain, although this does not provide the protection against saturation in the analog to digital converter circuit 214 as in the embodiment of FIG. 2. However, if the analog to digital converter circuit 214 is not at risk of saturation, operating in the digital domain may simplify the low latency multi-detector loop circuit 200 and be an attractive option for some environments. The feedback signal 266 cancels the low frequency or near-DC noise (that can appear to be a DC offset when considered over brief time intervals), subtracting an error value representative of the low frequency noise. This error value is formed based on various combinations of the low latency error value 252 and the error value 236, benefiting from the speed of the low latency detector circuit 240 as well as the robust error detection of the detector circuit 224. The resulting reduction in latency allows for maintaining a desired level of loop gain. Thus, multiple detectors (e.g., detector circuit 224 and low latency detector circuit 240) may be used in the DC loop to provide the benefits of both low latency and high accuracy.

The analog and digital divisions between portions of the low latency multi-detector loop circuit 200 can be placed wherever desired. As an example, the low latency detector circuit 240 may be adapted to operate in the analog domain, placing it before the analog to digital converter circuit 214 to operate on the sum 212 rather than the digital samples 216.

Figure 3:
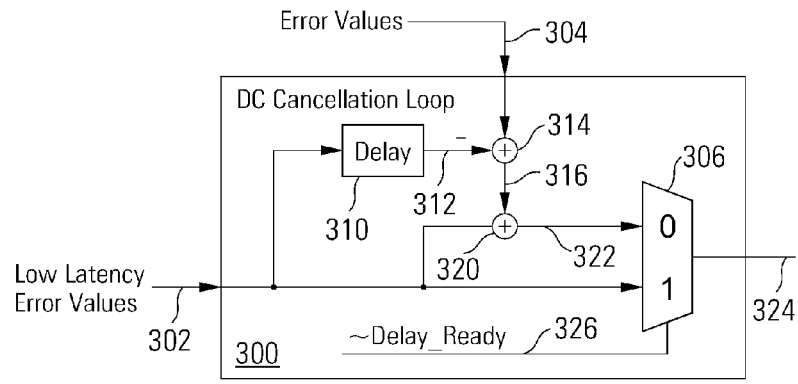
FIG. 3 depicts a DC cancellation circuit suitable for use in various embodiments of a low latency, multi-detector DC loop circuit in accordance with one or more embodiments of the present invention.

Turning to FIG. 3, a DC cancellation circuit 300 is depicted that may be used in place of the DC cancellation circuit 254 of FIG. 2 in accordance with some embodiments of the present invention. DC cancellation circuit 300 receives as input a low latency error value 302 and an error value 304, which are both error signals derived from a stream of digital samples. Generally, it can be expected that the low latency error value 302 is generated from the stream of digital samples more rapidly than the error value 304 and thus has a lower latency, but that the error value 304 is more accurate than the low latency error value 302. As an example, the latency of the low latency error value 302 may be 8 T, or 8 bit periods, from reception of the digital samples at a data detector to production of the low latency error value 302, with the latency of the error value 304 being 68 T. Thus, in this example, the error value 304 is delayed by 60 T over the low latency error value 302.

When the loop circuit in which the DC cancellation circuit 300 operates begins to detect data, the error value 304 and the delayed low latency error value 312 may be set to 0 in some embodiments until a time period equal to the latency period of the data detector has elapsed. Similarly, the low latency error value 302 may be set to 0 until the latency period of the low latency data detector has elapsed. Thus, in the example above, the low latency error value 302 would be set at 0 until 8 T after data detection begins, and delayed error correction value 316 would be set at 0 until 68 T after data detection begins.

The low latency error value 302 is provided to a selector circuit 306. In one particular embodiment of the present invention, selector circuit 306 is a multiplexer circuit. Low latency error value 302 is also provided to a delay circuit 310 that delays the low latency error value 302 until it is matched to the error value 304, producing a delayed low latency error value 312. The delay circuit 310 may be adapted to delay the low latency error value 302 by any suitable amount, including a predetermined difference in the latency of the error value 304 and the low latency error value 302, which results in the synchronization of the delayed low latency error value 312 with the error value 304. Given the latency examples above, with a latency of 8 T for low latency error value 302 and 68 T for error value 304, the delay circuit 310 may apply a delay of 60 T to the low latency error value 302 to synchronize the delayed low latency error value 312 with error value 304.

A summation circuit 314 subtracts the delayed low latency error value 312 from the error value 304, producing a delayed error correction value 316. Another summation circuit 320 adds the delayed error correction value 316 to the low latency error value 302, producing a corrected error value 322. Notably, the summation circuit 314 and summation circuit 320 may be combined or otherwise arranged in any suitable configuration to combine the error value 304, delayed low latency error value 312 and low latency error value 302, for example using a three-input summation circuit.

The selector circuit 306 operates to select either the low latency error value 302 or the corrected error value 322 as the output error value 324, depending on the state of a ~Delay_Ready selector signal 326. The selector signal 326 may be set to 1 to select the low latency error value 302 at the output error value 324, bypassing any correction to the low latency error value 302, or may be set to 0 to select the corrected error value 322 at the output error value 324. The corrected error value 322 is a combination of early error values (low latency error value 302), and delayed corrections of the early error values, corrected by error value 304. In equation form, the DC_err[i]=LLDET[i]+(DET[i]−LLDET[i-delay]), where DC_err[i] is the output error value 324 at bit period i, LLDET[i] is the low latency error value 302 at bit period i, DET[i] is the error value 304 at bit period i, and LLDET[i-delay] is the past low latency error value 302 at bit period (i-delay). The cancellation term (DET[i]−LLDET[i-delay]) essentially cancels out the low latency error value 302 and applies the error value 304 as soon as it is available. Thus, the corrected error value 322 reacts quickly to errors based on the low latency error value 302, and is later corrected using the more accurate error value 304.

For example, consider error values based on a digital sample that occurs at bit period 5 T, given the example latencies above of 8 T for low latency error value 302 and 68 T for error value 304. At bit period 13 T, the low latency error value 302 will produce an error value for the digital sample, say for example an error value of 2. Later, at bit period 73 T, the error value 304 will produce an error value for the digital sample, say for example an error value of 1. Because we assume that the error value 304 is more accurate than the low latency error value 302, we will correct the output error value 324 for the previous error value of 2 that was included in the output error value 324 at bit period 13 T, by subtracting the delayed low latency error value 312 (in this case, 2) from the error value 304 (in this case, 1), resulting in a delayed error correction value 316 of −1. Thus, the output error value 324 will initially include an error value of 2 for bit period 5 T (with the error value being included in output error value 324 at time 13 T), and will later be corrected by −1 to result in an error value of 1 for bit period 5 T (with this correction to output error value 324 occurring at time 73 T). When the low latency detector is making good decisions, the cancellation term should be very small. When the low latency detector is performing poorly, the cancellation term corrects the earlier low latency error values 302 with the equivalent and more accurate error values 304.

Figure 4:
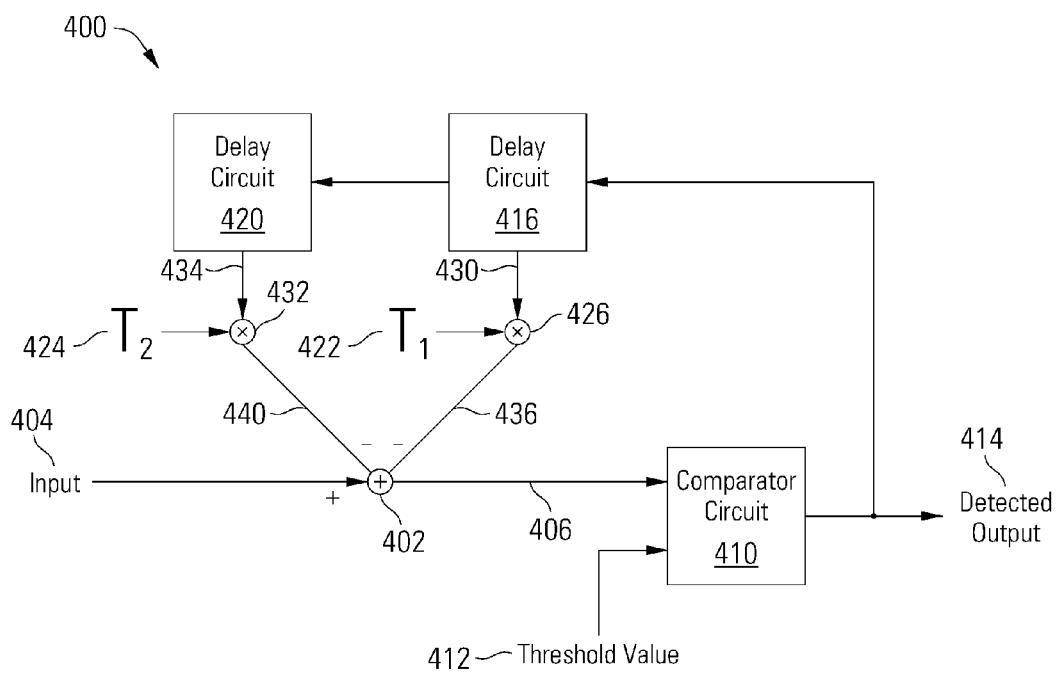
FIG. 4 depicts a decision feedback equalizer (DFE) circuit suitable for use in various embodiments of a low latency, multi-detector DC loop circuit in accordance with one or more embodiments of the present invention.

Turning to FIG. 4, a low latency detector circuit 400 is depicted that may be used in place of the low latency detector circuit 240 of FIG. 2 in accordance with some embodiments of the present invention. In this embodiment, low latency detector circuit 400 comprises a decision feedback equalizer (DFE) circuit, which detects a bit by convolving the last two bits with the partial response targets or interference coefficients, subtracting these from the current x-value (or sampled bit). The result is sliced to produce a new bit. These most recent three bits are then convolved with the partial response targets in a partial response target circuit such as partial response target circuit 244 of FIG. 2 to produce a current y-ideal or detected bit. The difference between this y-ideal and the current x-value is the error signal.

Low latency detector circuit 400 includes a summation circuit 402 that receives an input signal 404. Summation circuit 402 subtracts an interference value 436 and an interference value 440 from input 404 to yield a sum 406. Sum 406 is provided to a comparator circuit 410 where it is compared with a threshold value 412. In some cases, threshold value 412 is a hardwired value of zero. Comparator circuit 410 provides a '+1' as a detected output 414 when sum 406 is greater than or equal to threshold value 412, and provides a '−1' as a detected output 414 when sum 416 is less than threshold value 412. Thus, comparator circuit 410 operates to "slice" the received input into a series of either '+1s' or '−1s'.

Detected output 414 is provided as an output, and also fed back through a first delay circuit 416 and a second delay circuit 420. Two interference coefficients (T1 422 and T2 424) corresponding to respective delayed bit periods are multiplied by a respective delayed output. In particular, an interference coefficient 422 corresponds to an amount of interference caused by a bit directly preceding the current bit and is multiplied using a multiplier circuit 426 by a delayed output 430 from delay circuit 416. An interference coefficient 424 corresponds to an amount of interference caused by a bit preceding the current bit by two periods and is multiplied using a multiplier circuit 432 by a delayed output 434 from delay circuit 420. The output of multiplier circuit 426 is provided as interference value 436, and the output of multiplier circuit 432 is provided as interference value 440. Note that the low latency detector circuit 400 is not limited to any particular number of interference coefficients or taps, and that other embodiments may include more or less than the low latency detector circuit 400 of FIG. 4.

In operation, low latency detector circuit 400 receives input signal 404 that is either the input provided to a detector circuit or is a signal from which the input to the detector circuit is derived. Interference (i.e., interference value 436 and interference value 440) corresponding to two bit periods directly preceding the currently processing bit is subtracted from input 404. The resulting sum 406 is then simplified by slicing it into either a '+1' or a '−1' which is provided as detected output 414.

Figure 5:
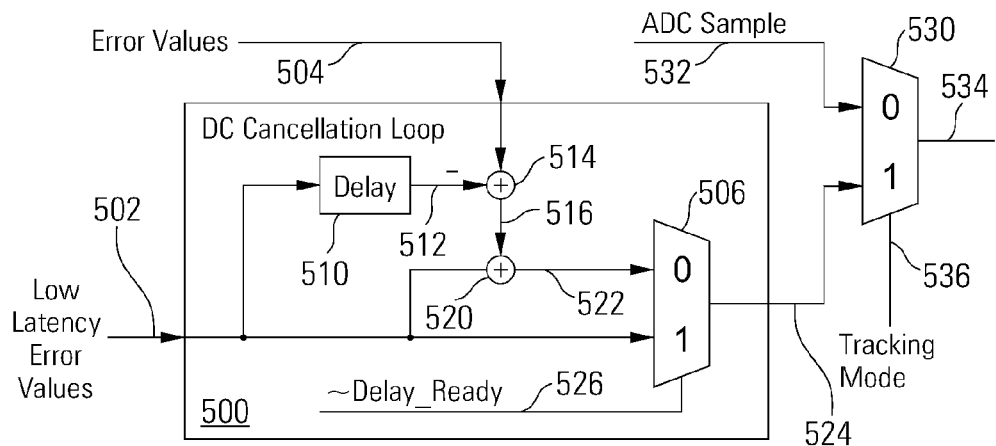
FIG. 5 depicts a DC cancellation circuit which enables bypass of a low latency error detector with an analog to digital converter (ADC) sample output, suitable for use in various embodiments of a low latency, multi-detector DC loop circuit in accordance with one or more embodiments of the present invention.

Turning to FIG. 5, a DC cancellation circuit 500 and associated circuitry is depicted that may be used in place of the DC cancellation circuit 254 of FIG. 2 in accordance with some embodiments of the present invention. DC cancellation circuit 500 receives as input a low latency error value 502 and a higher-accuracy, higher latency error value 504, which are both error signals derived from a stream of digital samples. The low latency error value 502 is provided to a selector circuit 506. Low latency error value 502 is also provided to a delay circuit 510 that delays the low latency error value 502 until it is matched to the error value 504, producing a delayed low latency error value 512. A summation circuit 514 subtracts the delayed low latency error value 512 from the error value 504, producing a delayed error correction value 516. Another summation circuit 520 adds the delayed error correction value 516 to the low latency error value 502, producing a corrected error value 522. As with the DC cancellation circuit 300 of FIG. 3, the summation circuit 514 and summation circuit 520 may be combined or otherwise arranged in any suitable configuration to combine the error value 504, delayed low latency error value 512 and low latency error value 502, for example using a three-input summation circuit. The selector circuit 506 operates to select either the low latency error value 502 or the corrected error value 522 as the output error value 524, depending on the state of ~Delay_Ready selector signal 526.

The output error value 524 is provided to a selector circuit 530, along with ADC samples 532, which may in some embodiments be obtained from digital samples 216. The selector circuit 530 operates to select either the output error value 524 from the DC cancellation circuit 500 or the ADC samples 532 as output 534, depending on the tracking mode 536. In some embodiments, the system is in tracking mode when reading a stream of data bits, for example when reading the user data portion in a magnetic storage system, and the system is out of tracking mode when not reading real data, for example when attempting to recover and synchronize with a clock signal in a preamble in a magnetic storage system. The selector circuit 530 enables the error correction from both low latency error value 502 and error value 504 to be disabled when not tracking a stream of data bits. In some embodiments, the output 534 may be used in place of error value 256 in FIG. 2.

Figure 6:
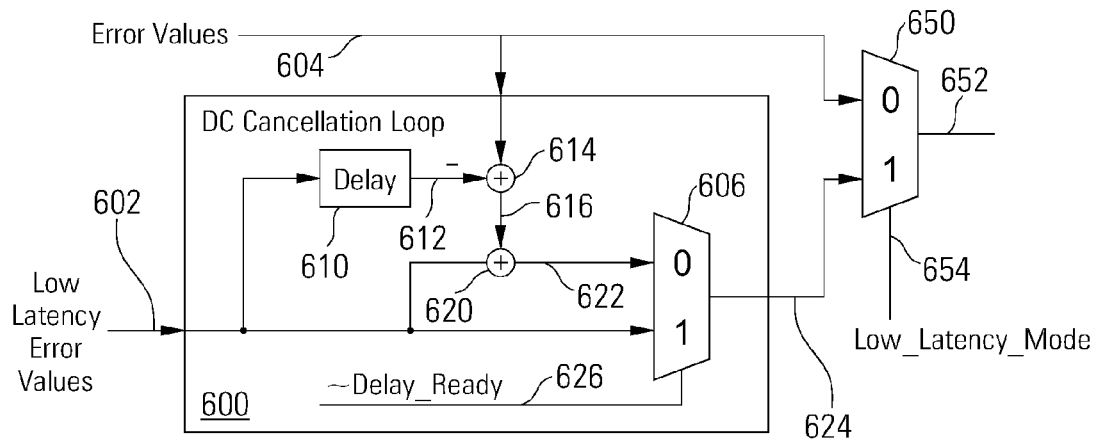
FIG. 6 depicts a DC cancellation circuit which enables bypass of a low latency error detector with a Viterbi error signal, suitable for use in various embodiments of a low latency, multi-detector DC loop circuit in accordance with one or more embodiments of the present invention.

Turning to FIG. 6, a DC cancellation circuit 600 and associated circuitry is depicted that may be used in place of the DC cancellation circuit 254 of FIG. 2 in accordance with some embodiments of the present invention. DC cancellation circuit 600 receives as input a low latency error value 602 and a higher-accuracy, higher latency error value 604, which are both error signals derived from a stream of digital samples. The low latency error value 602 is provided to a selector circuit 606. Low latency error value 602 is also provided to a delay circuit 610 that delays the low latency error value 602 until it is matched to the error value 604, producing a delayed low latency error value 612. A summation circuit 614 subtracts the delayed low latency error value 612 from the error value 604, producing a delayed error correction value 616. Another summation circuit 620 adds the delayed error correction value 616 to the low latency error value 602, producing a corrected error value 622. As with the DC cancellation circuit 300 of FIG. 3, the summation circuit 614 and summation circuit 620 may be combined or otherwise arranged in any suitable configuration to combine the error value 604, delayed low latency error value 612 and low latency error value 602, for example using a three-input summation circuit. The selector circuit 606 operates to select either the low latency error value 602 or the corrected error value 622 as the output error value 624, depending on the state of ~Delay_Ready selector signal 626.

The output error value 624 from DC cancellation circuit 600 is provided to a selector circuit 650, along with error value 604. The selector circuit 650 operates to select either the output error value 624 from the DC cancellation circuit 600 or the error value 604 as output 652, depending on the low latency mode selector signal 654. In some embodiments, the system is in low latency mode when including the low latency error value 602 in the DC loop, and is out of low latency mode when relying solely on the more accurate error value 604. In some embodiments, the output 652 may be used in place of error value 256 in FIG. 2.

Figure 7:
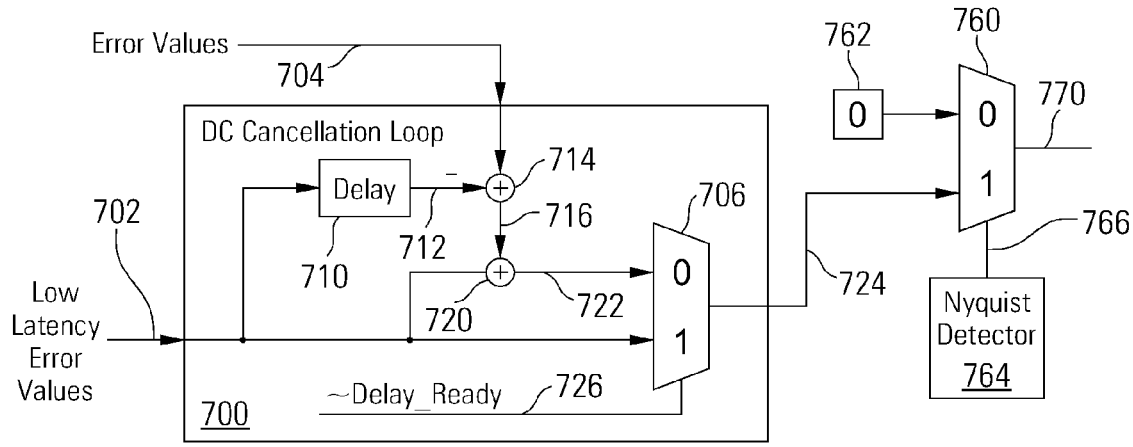
FIG. 7 depicts a DC cancellation circuit with an associated Nyquist detector to zero out the output of a low latency data detector if a Nyquist pattern is detected, suitable for use in various embodiments of a low latency, multi-detector DC loop circuit in accordance with one or more embodiments of the present invention.

Turning to FIG. 7, a DC cancellation circuit 700 and associated circuitry is depicted that may be used in place of the DC cancellation circuit 254 of FIG. 2 in accordance with some embodiments of the present invention. DC cancellation circuit 700 receives as input a low latency error value 702 and a higher-accuracy, higher latency error value 704, which are both error signals derived from a stream of digital samples. The low latency error value 702 is provided to a selector circuit 706. Low latency error value 702 is also provided to a delay circuit 710 that delays the low latency error value 702 until it is matched to the error value 704, producing a delayed low latency error value 712. A summation circuit 714 subtracts the delayed low latency error value 712 from the error value 704, producing a delayed error correction value 716. Another summation circuit 720 adds the delayed error correction value 716 to the low latency error value 702, producing a corrected error value 722. As with the DC cancellation circuit 300 of FIG. 3, the summation circuit 714 and summation circuit 720 may be combined or otherwise arranged in any suitable configuration to combine the error value 704, delayed low latency error value 712 and low latency error value 702, for example using a three-input summation circuit. The selector circuit 706 operates to select either the low latency error value 702 or the corrected error value 722 as the output error value 724, depending on the state of ~Delay_Ready selector signal 726.

The output error value 724 from DC cancellation circuit 700 is provided to a selector circuit 760, along with a hardwired zero value 762. The selector circuit 760 operates to select either the output error value 724 from the DC cancellation circuit 700 or the hardwired zero value 762 as output 770, depending on a selector signal 766 from a Nyquist detector 764. In some embodiments, the output 734 may be used in place of error value 256 in FIG. 2. The Nyquist detector 764 is triggered whenever the output (e.g., low latency detected output 242) of a low latency detector circuit (e.g., 240) upon which the low latency error value 702 is based includes a Nyquist pattern. The Nyquist pattern is an alternating bit pattern of a predetermined length, such as 5 alternating bits. Thus, a bit pattern of [+1, −1, +1, −1, +1] or of [−1, +1, −1, +1, −1] is a Nyquist pattern and will cause the Nyquist detector 764 to set the selector signal 766 to zero out the low latency detected output (e.g., 242) from the low latency detector circuit (e.g., 240) by selecting the hardwired zero value 762. Notably, the length of the Nyquist pattern may be made longer or shorter as desired. The Nyquist detector 764 may also be placed in other locations in the DC loop circuit, such as in the low latency detector circuit 400 of FIG. 4.

It should be appreciated by one of ordinary skill in the art that the selector circuits of FIGS. 5-7 may be combined in various combinations in different embodiments, and the functions described with respect to the selector circuits of FIGS. 5-7 may be performed by a variety of different devices, located at a number of different locations in the DC loop.

Figure 8A:
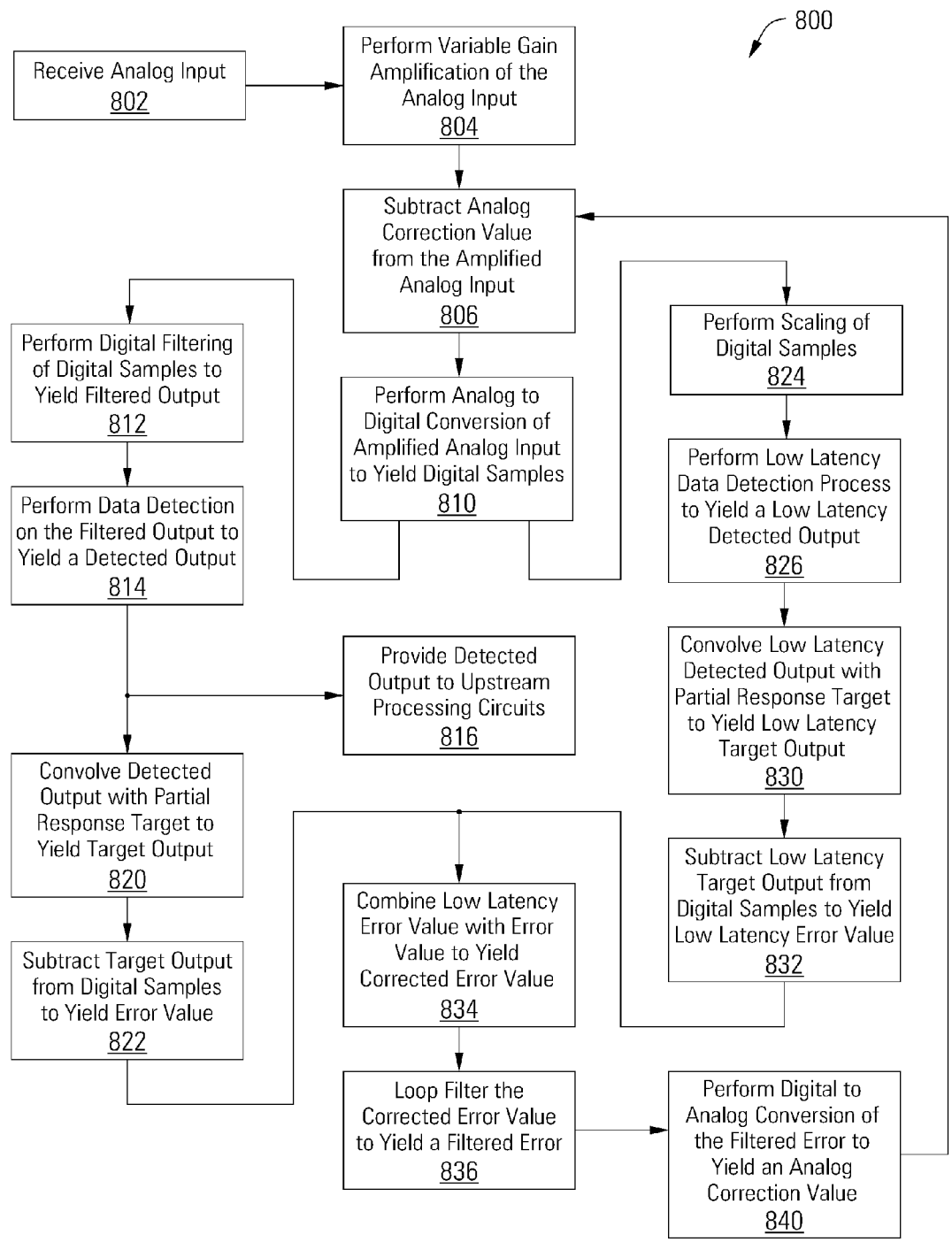
FIG. 8A is a flow diagram showing a method for low latency, multi-detector DC loop processing in accordance with some embodiments of the present invention.

Turning to FIG. 8A, a flow diagram 800 shows a method for low latency, multi-detector DC loop processing in accordance with some embodiments of the present invention. Following flow diagram 800, an analog input is received (block 802). The received analog input may be any analog signal carrying information to be processed. In some embodiments of the present invention, the analog input is derived from a storage medium. In other embodiments of the present invention, the analog input is derived from a transmission device. Based upon the disclosure provided herein, one of ordinary skill in the art will recognize a variety of analog signals and/or sources thereof that may be used in relation to different embodiments of the present invention. A variable gain amplification is applied to the received analog input to yield an amplified output (block 804). An analog correction value (e.g., a feedback value) is subtracted from the amplified analog input to yield a sum (block 806), and an analog to digital conversion is applied to the sum yielding a series of digital samples (block 810).

The digital samples are filtered to yield a filtered output (block 812). The filtering process may be any filtering known in the art including, but not limited to, a digital finite impulse response filtering process. A data detection process is then applied to the filtered output that yields a detected output (block 814). The data detection process may be any data detection process known in the art including, but not limited to, a maximum a posteriori data detection process or a Viterbi algorithm data detection process. The result of the detection process is provided as a detected output to one or more upstream processing circuits (block 816). The detected output is also provided to a partial response target circuit where it is convolved with one or more partial response target coefficients to yield a target output or partial response output (block 820). The target output is then subtracted from the digital samples to yield an error value (block 822).

In addition, the digital samples are scaled (block 824), and a low latency data detection process is applied to the scaled digital samples to yield a low latency detected output (block 826). The digital samples are scaled by the DC gain of the filtering applied in block 812. The low latency detection process operates to provide a reasonable approximation of data detection process performed in block 814, but in a shorter period of time. The low latency data detection process may not provide the accuracy of the detection process, but the effect of any errors can be limited by combining the results of the two detector processes.

The low latency detected output is provided to a partial response target circuit where it is convolved with one or more target coefficients to yield a low latency target output (block 830). The low latency target output is then subtracted from the digital samples to yield a low latency error value (block 832). The low latency error value is combined with the error value to yield a corrected error value (block 834). The corrected error value is loop filtered to yield a filtered output (block 836), and a digital to analog conversion is applied to the filtered output to yield an analog correction value (block 840), which is subtracted from the amplified analog input to yield the sum in block 806.

Figure 8B:
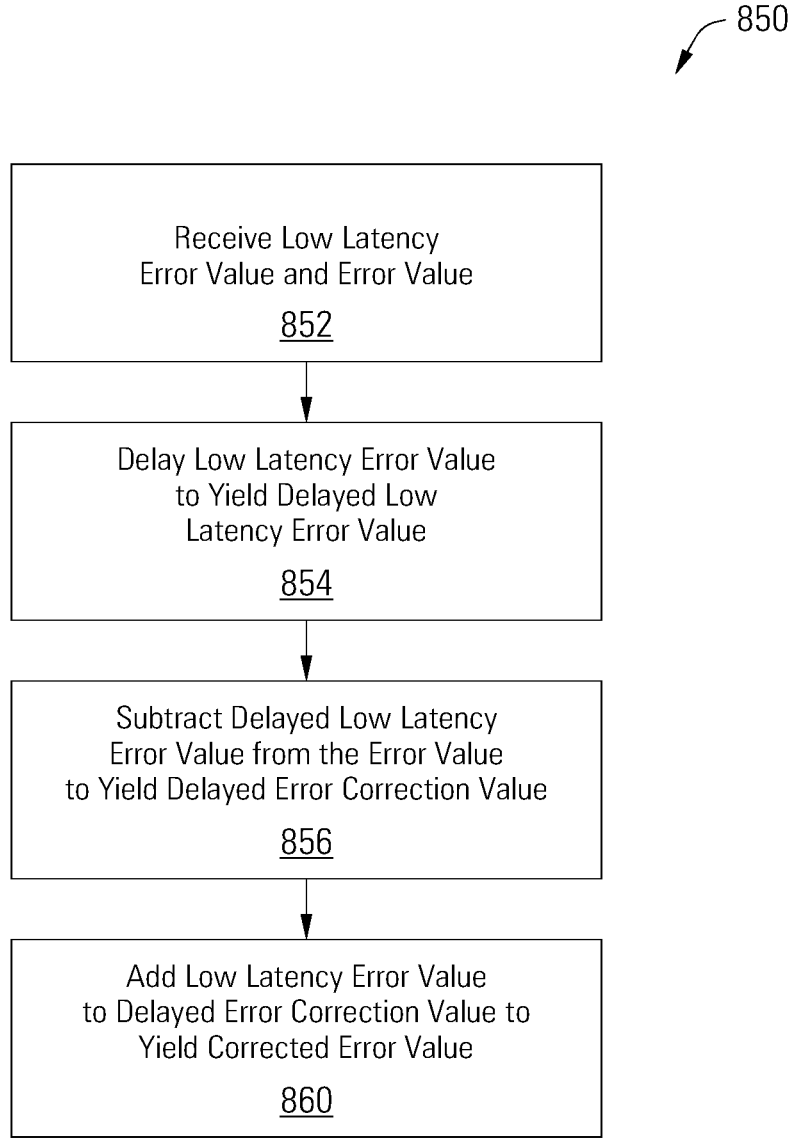
FIG. 8B is a flow diagram showing a method for combining an error value with a low latency error value during low latency, multi-detector DC loop processing in accordance with some embodiments of the present invention.

Turning to FIG. 8B, a flow diagram 850 shows a method for combining a low latency error value with an error value to yield a corrected error value which may be used in place of block 834 of FIG. 8A in accordance with some embodiments of the present invention. Following flow diagram 850, a low latency error value and an error value is received (block 852). In some embodiments, the low latency error value and error value may be generated by multiple data detectors based on a stream of digital samples. The low latency error value is delayed to yield delayed low latency error value (block 854). The low latency error value is delayed by an amount that aligns or synchronizes it with the error value, matching the latency in the low latency error value to the latency in the error value. The delayed low latency error value is subtracted from the error value to yield a delayed error correction value (block 856). The low latency error value is added to delayed error correction value to yield a corrected error value (block 860), which may be loop filtered as in block 836 of FIG. 8A. It will be recognized by one of ordinary skill in the art that the delayed low latency error value, the low latency error value and the error value may be combined in different orders or in a single operation.

Some embodiments of a method for low latency, multi-detector DC loop processing may include selecting ADC samples instead of corrected error values to be loop filtered as in block 836 of FIG. 8A when in tracking mode. Various embodiments of a method for low latency, multi-detector DC loop processing may include selecting the error values instead of corrected error values to be loop filtered as in block 836 of FIG. 8A when not in a low latency mode. Various embodiments of a method for low latency, multi-detector DC loop processing may include zeroing the low latency error value if a Nyquist pattern is detected in the low latency detected output.

Figure 9:
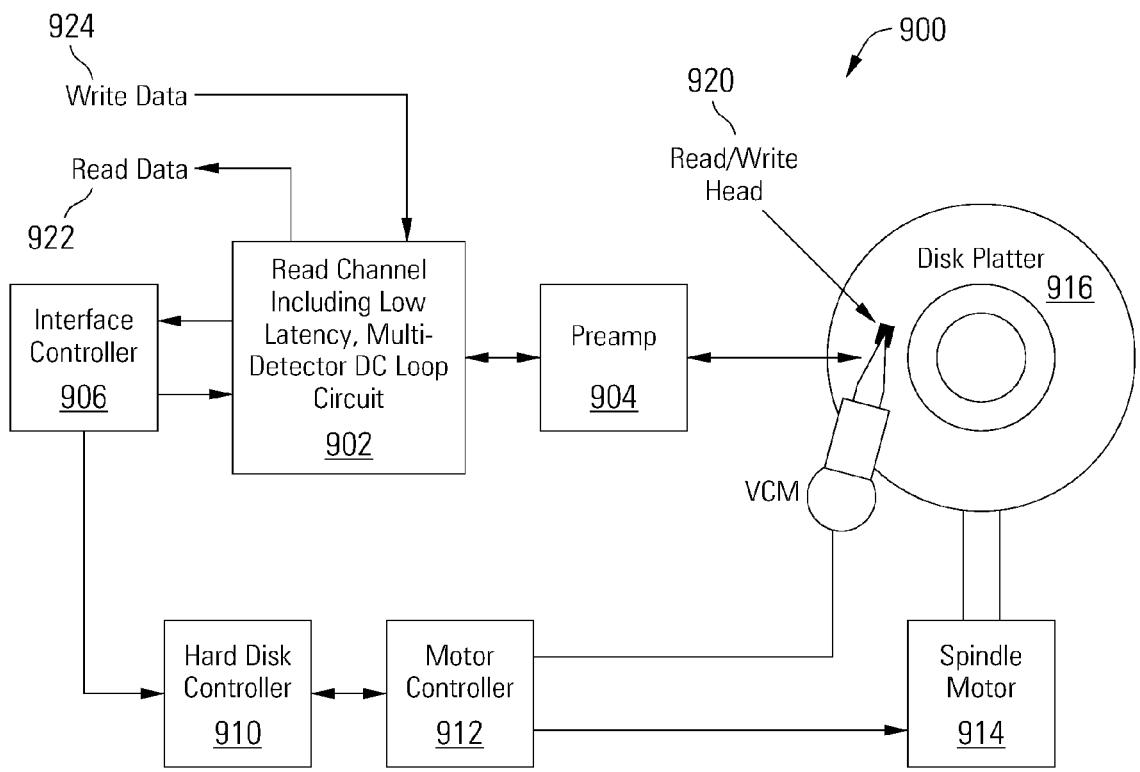
FIG. 9 depicts a storage system including a read channel circuit with a low latency, multi-detector DC loop circuit in accordance with some embodiments of the present invention.

FIG. 9 shows a storage system 900 including a read channel circuit 902 with a low latency multi-detector DC loop circuit in accordance with some embodiments of the present invention. Storage system 900 may be, for example, a hard disk drive. Storage system 900 also includes a preamplifier 904, an interface controller 906, a hard disk controller 910, a motor controller 912, a spindle motor 914, a disk platter 916, and a read/write head assembly 920. Interface controller 906 controls addressing and timing of data to/from disk platter 916. The data on disk platter 916 consists of groups of magnetic signals that may be detected by read/write head assembly 920 when the assembly is properly positioned over disk platter 916. In one embodiment, disk platter 916 includes magnetic signals recorded in accordance with either a longitudinal or a perpendicular recording scheme.

In a typical read operation, read/write head assembly 920 is accurately positioned by motor controller 912 over a desired data track on disk platter 916. Motor controller 912 both positions read/write head assembly 920 in relation to disk platter 916 and drives spindle motor 914 by moving read/write head assembly 920 to the proper data track on disk platter 916 under the direction of hard disk controller 910. Spindle motor 914 spins disk platter 916 at a determined spin rate (RPMs). Once read/write head assembly 920 is positioned adjacent the proper data track, magnetic signals representing data on disk platter 916 are sensed by read/write head assembly 920 as disk platter 916 is rotated by spindle motor 914. The sensed magnetic signals are provided as a continuous, minute analog signal representative of the magnetic data on disk platter 916. This minute analog signal is transferred from read/write head assembly 920 to read channel circuit 902 via preamplifier 904. Preamplifier 904 is operable to amplify the minute analog signals accessed from disk platter 916. In turn, read channel circuit 902 decodes and digitizes the received analog signal to recreate the information originally written to disk platter 916. This data is provided as read data 922 to a receiving circuit. As part of decoding the received information, read channel circuit 902 processes the received signal using a low latency multi-detector DC loop circuit. Such a low latency multi-detector DC loop circuit may be implemented consistent with that described above in relation to FIGS. 2-7. In some cases, the low latency multi-detector DC loop processing may be done consistent with the flow diagram of FIG. 8. A write operation is substantially the opposite of the preceding read operation with write data 924 being provided to read channel circuit 902. This data is then encoded and written to disk platter 916.

It should be noted that storage system 900 may be integrated into a larger storage system such as, for example, a RAID (redundant array of inexpensive disks or redundant array of independent disks) based storage system. It should also be noted that various functions or blocks of storage system 900 may be implemented in either software or firmware, while other functions or blocks are implemented in hardware.

Figure 10:
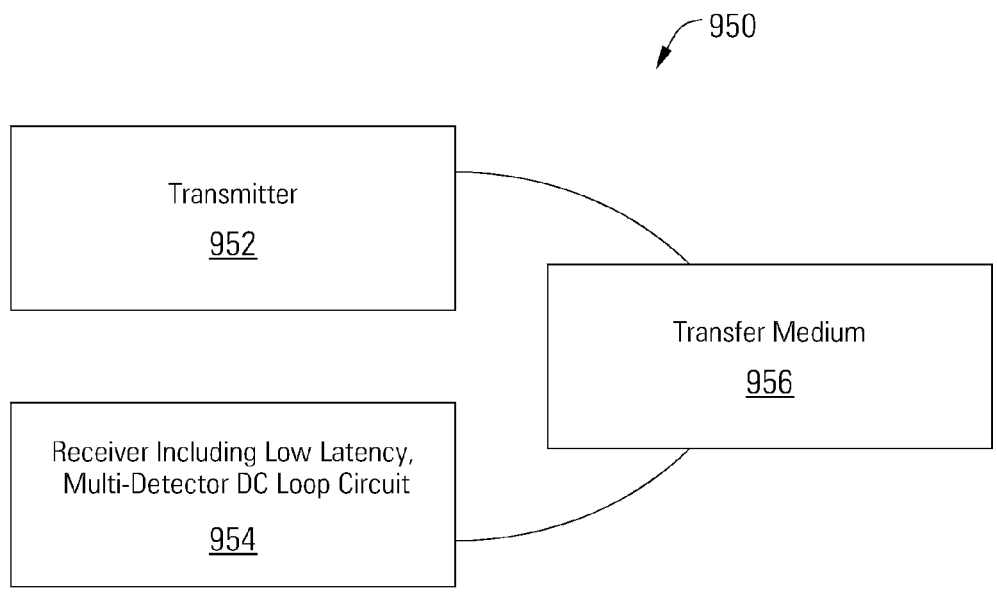
FIG. 10 depicts a wireless communication system including a receiver with a low latency, multi-detector DC loop circuit in accordance with some embodiments of the present invention.

Turning to FIG. 10, a wireless communication system 950 including a receiver with a low latency multi-detector DC loop circuit is shown in accordance with some embodiments of the present invention. Communication system 950 includes a transmitter 952 that is operable to transmit encoded information via a transfer medium 956 as is known in the art. The encoded data is received from transfer medium 956 by receiver 954. Receiver 954 incorporates a low latency multi-detector DC loop circuit. Such a low latency multi-detector DC loop circuit may be implemented consistent with that described above in relation to FIGS. 2-7. In some cases, the low latency multi-detector DC loop processing may be done consistent with the flow diagram of FIG. 8.

It should be noted that the various blocks disclosed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits disclosed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit, comprising:
    a first data detector circuit operable to perform a data detection process on a first signal derived from a data input to yield a detected output;
    a second data detector circuit operable to perform a data detection process on a second signal derived from the data input to yield a second detected output;
    an error cancellation circuit operable to combine a first error signal derived from the detected output with a second error signal derived from the second detected output to yield a feedback signal; and
    a summation circuit operable to subtract the feedback signal from the data input.

2. The data processing circuit of claim 1, wherein a first data detector circuit latency is greater than a second data detector circuit latency.

3. The data processing circuit of claim 1, wherein the error cancellation circuit comprises:
    a delay circuit operable to delay the second error signal to yield a delayed second error signal; and
    a summation circuit operable to add the first error signal and add the second error signal and subtract the delayed second error signal to yield the feedback signal.

4. The data processing circuit of claim 3, wherein the delay circuit is operable to delay the second error signal to match a delayed second error signal latency with a first error signal latency.

5. The data processing circuit of claim 1, wherein the first signal and the second signal are the same signal.

6. The data processing circuit of claim 1, wherein the circuit further comprises:
   an analog to digital converter circuit operable to convert the data input into a corresponding digital output;
   a digital filter operable to filter the digital output and provide a filtered output;
   a scaler operable to scale the digital output by a DC gain of the digital filter and provide a scaled output; and
   wherein the first signal is the filtered output, and wherein the second signal is the scaled output.

7. The data processing circuit of claim 6, wherein the circuit further comprises:
   a loop filter circuit operable to filter the feedback signal to yield a filtered feedback signal; and
   a digital to analog converter circuit operable to convert the filtered feedback signal into an analog feedback signal, wherein the summation circuit is operable to subtract the analog feedback signal from the data input.

8. The data processing circuit of claim 1, wherein the second data detector circuit comprises:
   a second summation circuit operable to sum the second signal with an interference value to yield a sum;
   a comparator circuit operable to receive the sum and to provide the second detected output based at least in part on a value of the sum;
   a delay circuit operable to delay the sum by a bit period to yield a delayed output; and
   a multiplier circuit operable to multiply the delayed output by an interference coefficient corresponding to a preceding bit period to yield the interference value.

9. The data processing circuit of claim 8, wherein the second data detector circuit further comprises:
   a second delay circuit operable to delay the delayed output to yield a second delayed output; and
   a second multiplier circuit operable to multiply the second delayed output by a second interference coefficient corresponding to a second preceding bit period to yield a second interference value, wherein the second summation circuit is further operable to sum the second signal with the second interference value to yield the sum, and wherein the preceding bit period directly precedes a current bit period, and wherein the second preceding bit period directly precedes the preceding bit period.

10. The data processing circuit of claim 1, wherein the circuit further comprises:
    a first partial response target circuit operable to convolve the detected output with a first partial response target to yield a first partial response output;
    a second summation circuit operable to subtract the first partial response output from a digital data input derived from the data input to yield the first error signal;
    a second partial response target circuit operable to convolve the second detected output with a second partial response target to yield a second partial response output; and
    a third summation circuit operable to subtract the second partial response output from the digital data input to yield the second error signal.

11. The data processing circuit of claim 1, wherein the circuit further comprises a Nyquist detection circuit operable to detect an alternating bit pattern in the second detected output and to set the second detected output to zero when the alternating bit pattern is detected.

12. The data processing circuit of claim 1, wherein the data processing circuit is implemented as an integrated circuit.

13. The data processing circuit of claim 1, wherein the data processing circuit is incorporated in a storage device.

14. The data processing circuit of claim 1, wherein the data processing circuit is incorporated in a data transmission device.

15. A method to process data, the method comprising:
    providing a first data detector circuit;
    providing a second data detector circuit;
    performing a data detection process using the first data detector circuit on a first signal derived from the data to yield a detected output;
    performing a second data detection process using the second data detector circuit on a second signal derived from the data to yield a second detected output;
    calculating an error value based on a first error signal derived from the detected output and on a second error signal derived from the second detected output;
    generating a feedback signal based at least in part on the error value; and
    subtracting the feedback signal from the data.

16. The method of claim 15, wherein a latency between the data and the first error signal is greater than a second latency between the data and the second error signal.

17. The method of claim 16, wherein calculating the error value comprises:
    applying a delay to the second error signal to yield a delayed second error signal;
    subtracting the delayed second error signal from the first error signal to yield a corrected error signal; and
    adding the second error signal to the corrected error signal to yield the error value.

18. The method of claim 15, wherein the first error signal is derived from the detected output by convolving the detected output with a first partial response target to yield a first partial response output, and subtracting the first partial response output from a digital data input derived from the data to yield the first error signal, and wherein the second error signal is derived from the second detected output by convolving the second detected output with a second partial response target to yield a second partial response output, and subtracting the second partial response output from the digital data input to yield the second error signal.

19. The method of claim 15, further comprising monitoring the second detected output for an alternating bit pattern of a predetermined length, and setting the second detected output to zero when the alternating bit pattern is detected.

20. The method of claim 15, wherein performing the second data detection process comprises reducing interference evident in a current bit that is related to at least one preceding bit in a bit stream using a decision feedback equalizer.

21. The method of claim 15, further comprising replacing the feedback signal with digital samples of the data when not in a tracking mode.

22. A storage system, the storage system comprising:
    a storage medium maintaining a data set;
    a read/write head assembly operable to sense the data set on the storage medium and to provide an analog output corresponding to the data set;
    an amplifier circuit operable to amplify the analog output to yield a data input;
    an analog to digital converter operable to sample the data input to yield a digital data input;

a first data detector circuit operable to perform a first data detection process on a first signal derived from the digital data input to yield a first detected output;

a second data detector circuit operable to perform a second data detection process on a second signal derived from the digital data input to yield a second detected output;

an error cancellation circuit operable to combine a first error signal derived from the first detected output with a second error signal derived from the second detected output to yield a feedback signal; and a summation circuit operable to subtract the feedback signal from the data input.

23. The storage system of claim 22, wherein the first data detector circuit comprises a Viterbi detector, and wherein the second data detector circuit comprises a decision feedback equalizer, and wherein the error cancellation circuit comprises:

a delay circuit operable to equalize a latency in the first error signal and a second latency in the second error signal to yield a delayed second error signal; and a second summation circuit operable to add the first error signal and add the second error signal and subtract the delayed second error signal to yield the feedback signal.

\* \* \* \* \*